UNITED STATES PATENT OFFICE.

EDWIN L. SIMPSON, OF BRIDGEPORT, CONNECTICUT.

IMPROVEMENT IN RUBBER FOR DENTAL PURPOSES.

Specification forming part of Letters Patent No. 58,901, dated October 16, 1866.

*To all whom it may concern:*

Be it known that I, EDWIN L. SIMPSON, of Bridgeport, in the county of Fairfield and State of Connecticut, have invented a new Improvement in Dental Rubber; and I do hereby declare the following to be a full, clear, and exact description of the same.

The rubber now used for dental purposes has incorporated with it large proportions of free sulphur for the purpose of vulcanizing the rubber after it is formed. The odor and taste occasioned by the presence of this sulphur are extremely obnoxious to many persons, and occasion the principal if not the only objection to the use of rubber for dental purposes.

To overcome this objection and produce vulcanized rubber for dental purposes without the actual or apparent presence of sulphur is the object of my invention, and consists in preparing the rubber for vulcanizing by the introduction of a peculiar vulcanizing compound, for which I have applied for Letters Patent in even date herewith; and that others skilled in the art may be enabled to prepare and use my improved rubber, I will proceed to describe my manner of so doing.

I will first describe the vulcanizing compound as set forth in the specification accompanying my application for patent as aforesaid.

I first boil linseed or other vegetable oil to the consistency of honey, (this I do to facilitate the preparation,) thoroughly mixing two ounces of benzoin-gum with one pound of pulverized sulphur. Then to each quart of the boiled oil add one pound of the prepared sulphur, carefully subjecting this mixture to a moderate heat, sufficient only to cause the two substances to react upon each other until they pass from a semi-fluid to a semi-hard state, having a honey-comb or spongy appearance. This forms my vulcanizing compound, and differs from that patented to me February 28, 1865, in that the benzoin-gum is added, which, by its vaporizing qualities, more perfectly expels the fumes of the sulphur as well as the odor from the oil, and renders the compound nearly, if not perfectly, odorless, and when combined with india-rubber or similar gums and subjected to a regulated heat will cause the same to undergo the change known as "vulcanizing."

To produce my rubber for dental purposes, to one pound of india-rubber or gutta-percha add ten to fourteen ounces of my above-described compound, (the greater the quantity of the compound the harder will be the rubber after curing.) Twelve ounces I believe to be the proper quantity for general purposes. Thoroughly mix the compound and rubber by grinding between warm rolls. To produce the requisite color I add chrome-red or lake-pink in quantities to produce the requisite color, and when thoroughly mixed the substance will be in a plastic state, and in this state rolled into thin sheets and ready for the dentist's use.

The dentist forms the plate in the ordinary manner for other rubber, and when so formed it should be subjected to a heat of 320° Fahrenheit for about four hours, proportionately less time as the degree of heat is greater, (otherwise treat as ordinary rubber,) and the plate thus prepared will be as tasteless and odorless as metal plate, and will not tarnish the fillings or other gold in the mouth of the wearer.

Having therefore thus fully described my invention, what I claim as new and useful, and desire to secure by Letters Patent, is—

Combining the within-described vulcanizing compound with india-rubber in the proportions herein named, and substantially in the manner and for the purpose specified.

EDWIN L. SIMPSON.

Witnesses:
E. A. PENNILL,
E. BIRDSEY.